Aug. 23, 1932.                C. L. HALL                1,873,881
                         CONDUIT HOLDING DEVICE
                           Filed July 15, 1931
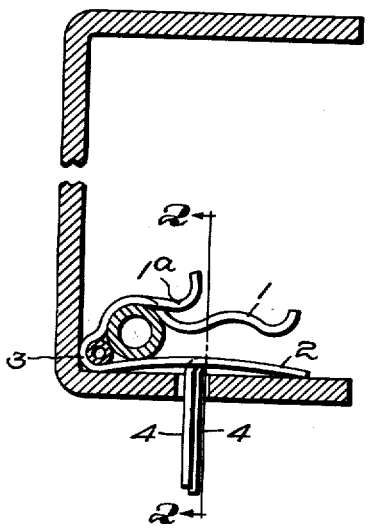
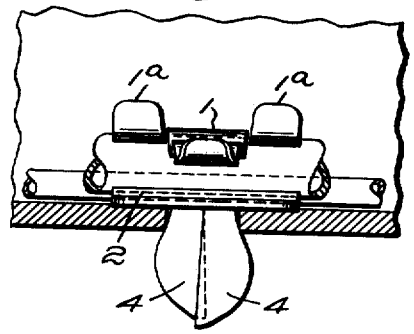
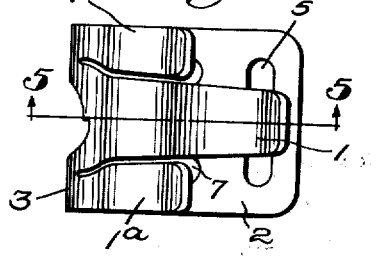
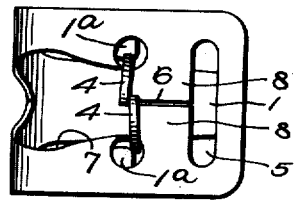
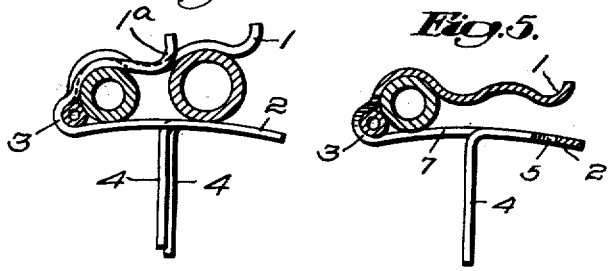
Inventor:
Charles L. Hall,
by Emery, Booth, Varney & Townsend
                                Att'ys Patented Aug. 23, 1932

1,873,881

UNITED STATES PATENT OFFICE

CHARLES L. HALL, OF DETROIT, MICHIGAN, ASSIGNOR TO UNITED-CARR FASTENER CORPORATION, OF CAMBRIDGE, MASSACHUSETTS, A CORPORATION OF MASSACHUSETTS

CONDUIT-HOLDING DEVICE

Application filed July 15, 1931. Serial No. 550,914.

My invention aims to provide improvements in detachable clip members for use in connection with holding in position conduits such as pipes, wires and the like.

Attention is directed to my co-pending applications Serial No. 533,038, filed April 27, 1931, and Serial No. 541,563, filed June 2, 1931, each of which contains claims generic to the structures covered by this application.

In the drawing which illustrates a preferred embodiment of my invention:

Figure 1 is a section taken through an installation showing my improved clip member in elevation;

Fig. 2 is a section taken on the line 2—2 of Figure 1, the clip member being shown in elevation;

Fig. 3 is a top plan view of the clip member shown in Figure 1;

Fig. 4 is a bottom plan view of the clip member;

Fig. 5 is a section of the clip member taken on the line 5—5 of Fig. 3 showing two pipes in position; and Fig. 6 is a side elevation of the device showing a third pipe held in place independently of two of the fingers at the top side of the clip portion.

Referring to the particular clip device illustrated by the drawing, I have shown a snap fastener attached clip which is particularly, though not exclusively, adapted for use in connection wtih securing gasoline pipes, air pipes, electric wires and the like to structures such as automobile bodies and frames.

My improved clip device is preferably formed from a single piece of yieldable sheet metal having a clip-like portion which is generally U-shaped to provide a pair of fingers 1 and 2 connected at one end by a portion 3. These fingers are yieldable toward and away from each other and are so shaped that they may receive between them and hold securely in position one or more wires, pipes, or combinations of both, such, for instance, as shown in Figure 1.

At each side of the finger 1 I have provided a shorter yieldable finger 1ª. All of the fingers are adapted to yield independently of each other. By this arrangement I can secure in position pipes or conduits, as shown in Figs. 1 and 5 or as shown in Fig. 6. In Fig. 6 it is clear that the finger 1 may yield independently of the other fingers 1ª and engage and hold another pipe without disturbing the pipe held in place by the fingers 1ª. The advantages of independently yieldable fingers are, it is believed, apparent to those skilled in the art and, therefore, need no further detailed explanation.

The clip portion of the device is adapted to be secured in position upon a frame or the like by means of a snap fastening which in the drawing comprises a pair of socket-engaging portions 4—4. These socket-engaging portions are formed from material located entirely within the periphery of the clip portion and in the particular device illustrated are formed mostly from the finger 2, as best illustrated in Figs. 1 and 3. The socket-engaging portions 4—4 are arranged somewhat in overlapping relation (Fig. 3) and extend at substantially a right angle from the finger 2 (Fig. 1) so that they may have a scissors-like action when being engaged with or disengaged from a supporting structure. The finger 2 is curved longitudinally to permit yielding thereof thereby to cooperate with the socket-engaging portions to adapt the device to various thicknesses of structures to which it is to be attached.

In order to secure maximum resiliency for the operation of the socket-engaging portions 4—4, I have provided a T-shaped cut which is located in the finger 2 between the socket-engaging portions 4—4 and the free end of the finger 2. This T-shaped cut comprises a slot 5 adjacent to the free end of the finger 2 (Figs. 2 and 3) and extending transversely relative to the clip portion. The other portion is in the form of a slit 6 which divides a portion of the finger 2 located between the slot 5 and the opening 7 formed by cutting out the socket-engaging portions 4—4, thereby providing yieldable portions 8—8, as best shown in Fig. 3.

I have illustrated and described a particularly efficient device which has certain details of structure not necessarily essential to carry out my important improvement with relation to the clip portion. Therefore, it should be understood that the idea of the use of a number of independently yieldable fingers at one side of the U-shaped clip portion may be used with structures otherwise different.

While I have illustrated and described a preferred embodiment of my invention, I do not wish to be limited thereby, because the scope of my invention is best defined by the following claims.

I claim:

1. A pipe and conduit attaching device having a U-shaped pipe engaging and holding portion comprising a pair of spaced fingers shaped to engage at least two conduits, one of the fingers of said pipe engaging and holding portion being divided into at least two independently yieldable portions to adapt themselves independently to the conduits and snap fastening means associated with and extending from said other finger portion of the pipe engaging and holding portion of the device for attachment of said device to a supporting structure having cooperating snap fastening means.

2. A device of the class described having a U-shaped clip portion, one of the finger portions of said U-shaped clip portion being divided into at least two independently yieldable portions of unequal lengths shaped to receive and hold at least one conduit against the other finger portion and snap fastening means associated with and extending from said other finger portion of the clip portion of the device for attachment of a device to a supporting structure having cooperating snap fastening means.

3. A device of the class described having a U-shaped clip portion, one of the finger portions of said U-shaped clip portion being divided longitudinally to provide a central yieldable portion and two other yieldable portions located at the sides of the central yieldable portion thereby providing independently yieldable portions shaped to receive and hold at least one conduit against the other finger portion and snap fastening means associated with and extending from said other finger portion of the clip portion of the device for attachment of a device to a supporting structure having cooperating snap fastening means.

4. A device of the class described having a U-shaped clip portion, one of the finger portions of said U-shaped clip portion being divided longitudinally to provide a central yieldable portion and two other yieldable portions located at the sides of the central yieldable portions thereby providing independently yieldable portions shaped to receive and hold at least one conduit against the other finger portion, said yieldable portions at the sides of the central yieldable portion being substantially shorter than said central finger portion for the purposes illustrated and described and snap fastening means associated with and extending from said other finger portion of the clip portion of the device for attachment of a device to a supporting structure having cooperating snap fastening means.

5. A device of the class described formed from a single piece of sheet metal and having a clip-like portion providing fingers 1 and 2 connected at one end by a portion 3, finger portions 1$^a$—1$^a$ formed by dividing the finger portion 1 longitudinally thereby providing a plurality of separately yieldable portions for the purposes illustrated and described and yieldable socket-engaging portions 4—4 formed integral with and extending from the finger 2 to provide means for quick detachable engagement of the device with a supporting structure having socket means.

In testimony whereof, I have signed my name to this specification.

CHARLES L. HALL.